United States Patent [19]

Lin

[11] Patent Number: 5,170,969

[45] Date of Patent: Dec. 15, 1992

[54] AIRCRAFT RUDDER COMMAND SYSTEM

[75] Inventor: Ching-Fang Lin, Renton, Wash.

[73] Assignee: The Boeing Company, Seattle, Wash.

[21] Appl. No.: 276,834

[22] Filed: Nov. 23, 1988
(Under 37 CFR 1.47)

[51] Int. Cl.$^5$ .............................................. G05D 1/00
[52] U.S. Cl. .................................. 244/194; 244/175;
244/195; 244/221; 244/230; 244/179
[58] Field of Search ............... 244/175, 177, 178, 194,
244/195, 221, 230

[56] References Cited

U.S. PATENT DOCUMENTS

| Re. 26,064 | 7/1966 | Bond et al. | 244/185 |
|---|---|---|---|
| 2,766,952 | 10/1956 | Alderson | 244/177 |
| 2,827,250 | 3/1958 | Rusler, Jr. | 244/179 |
| 2,833,495 | 5/1958 | Feeney et al. | 244/179 |
| 2,877,967 | 3/1959 | Markusen | 244/185 |
| 3,051,416 | 8/1962 | Rotier | 244/194 |
| 3,216,676 | 11/1965 | Brown et al. | 244/195 |
| 3,404,856 | 10/1968 | Gerstine | 244/177 |
| 3,446,946 | 5/1969 | Andeen | 244/195 |
| 3,636,324 | 1/1972 | Dommasch | 364/434 |
| 3,750,985 | 8/1973 | Wheldon | 244/220 |
| 3,777,242 | 12/1973 | Tribuno et al. | 318/586 |
| 3,809,867 | 5/1974 | Hattendorf | 364/434 |
| 3,819,135 | 6/1974 | Foxworthy et al. | 244/177 |
| 3,837,603 | 9/1974 | Schultz et al. | 244/184 |
| 3,848,172 | 11/1974 | Thomas | 318/586 |
| 4,046,341 | 9/1977 | Quinlivan | 244/179 |
| 4,094,479 | 6/1978 | Kennedy, Jr. | 244/179 |
| 4,371,939 | 2/1983 | Adams et al. | 364/434 |
| 4,387,431 | 6/1983 | Wright et al. | 364/434 |
| 4,460,858 | 7/1984 | Ashland | 318/585 |
| 4,481,586 | 11/1984 | Skutecki | 364/434 |
| 4,482,961 | 11/1984 | Kilner et al. | 364/428 |
| 4,484,283 | 11/1984 | Verzella et al. | 364/434 |
| 4,500,967 | 2/1985 | Murphy et al. | 364/434 |
| 4,521,855 | 6/1985 | Lehner et al. | 364/434 |
| 4,553,210 | 11/1985 | Centala | 364/434 |
| 4,563,743 | 1/1986 | Murphy et al. | 364/434 |

FOREIGN PATENT DOCUMENTS 231614 12/1984 Japan.

6500522 2/1979 U.S.S.R. .

OTHER PUBLICATIONS

Sankrithi et al., "757 Manual Flight Control Functions," AIAA Guidance & Control Conference, Monterey, Calif. Aug. 17-19, 1987.
Nordwall, "Boeing Evaluating New Control Laws in 757 Advanced-Technology Simulator," *Aviation Week & Space Technology*, Ju. 29, 1987 p. 54.

Primary Examiner—Joseph F. Peters, Jr.
Assistant Examiner—Anne E. Bidwell
Attorney, Agent, or Firm—Christensen, O'Connor, Johnson & Kindness

[57] ABSTRACT

An aircraft rudder command system for allowing a pilot to directly input a sideslip command for yaw-axis control through use of the rudder pedals is disclosed. The aircraft rudder command system includes a pedal input device for receiving a pedal input signal indicative of pilot rudder pedal input, a signal-receiving device for receiving feedback signals indicative of the current state of aircraft operation, a command generator system responsive to the pedal input signal and at least one of the feedback signals for generating a sideslip angle command, command limiting means for generating a limited sideslip angle command, and a feedback control system for transmitting a sideslip control rudder command to a rudder actuation system. The rudder actuation system causes the rudder to move in such a manner so as to produce an actual aircraft sideslip angle which follows the limited sideslip angle command. The aircraft rudder command system may also include a sideslip estimator. The sideslip estimator includes a component for receiving an airmass sideslip signal, a sideslip rate estimator for generating a sideslip rate estimate signal, and a complementary filter for synthesizing a sideslip angle estimate signal from the airmass sideslip signal and the sideslip rate estimate signal. The rudder actuation system, in turn, causes the rudder to move in such a manner so as to cause the sideslip angle estimate signal to follow the limited sideslip angle command.

18 Claims, 9 Drawing Sheets

AIRCRAFT RUDDER COMMAND SYSTEM

TECHNICAL AREA

This invention relates to an aircraft sideslip control and augmentation system for producing rudder command signals. More particularly, this invention relates to the use of sideslip estimation, control and limiting for pilot-in-the-loop sideslip control.

BACKGROUND OF THE INVENTION

As is well known in the art of aircraft control, it is desirable to control and limit the sideslip, i.e., yaw-axis motion, of an aircraft during in-flight turns and other maneuvers. Two characteristics that affect this control are the tail configuration and the implementation of pilot rudder control commands. With regard to tail configuration, the aircraft tail provides directional stability in flight and is designed to enhance other aircraft characteristics. For example, large vertical tails, sized for engine out considerations, are used conventionally for wing mounted engine configurations. With regard to pilot rudder control commands, the employment of pilot rudder control through a rudder command system has long been practiced. The rudder command system includes pilot rudder pedals, the displacement of which causes a related physical displacement of the rudder. The pilot pedal input may be proportionally modified by a rudder ratio changer. The rudder command system provides the pilot with a device for causing sideslip of the aircraft to thereby allow de-crab in crosswind landings. Additionally, the rudder command system provides a certain amount of turn coordination whereby the pilot controls sideslip in a turn. Finally, the rudder command system generally utilizes a yaw augmentation system (i.e., yaw damper) to improve Dutch roll damping characteristics. In each of the instances, the pilot may be expected to account for certain flight variables such as wind direction and speed, sideslip, yaw rate, roll angle, roll rate, lateral acceleration, etc., in determining the proper amount of rudder, i.e., pedal input, necessary to accomplish a specific maneuver.

Aircraft with wing-mounted engines and large vertical tail configurations, although benefiting from good directional stability, suffer from high structural fin loads for rudder maneuvers, high gust loads in turbulence, and poor lateral ride quality in turbulence. In contrast, aircraft having tail-mounted engines and T-tail configurations do not require a large vertical tail for engine-out considerations. In these latter configurations, the vertical tail size can be reduced. Benefits of reduced vertical tail size include: reduced gust loads and rudder maneuver structural loads; improved ride quality in turbulence; reduced weight and drag; and improved balance. One drawback from the reduced tail size is reduced directional stability.

To control an aircraft having reduced tail size, yaw augmentation is required to maintain stability and low rudder activity is required to limit fin loads. In an aircraft with reduced tail size, a closed-loop system with conventional yaw damper and turn coordination controls may be unable to maintain directional stability. Furthermore, it may be necessary to set a conventional ratio changer to a very low value (thus reducing pilot yaw control authority and ability to trim out on engine failure) to prevent the pilot from causing excessive fin load with his pedal inputs. Therefore, to improve performance in aircraft configured with reduced tail sizes, a full rudder authority closed-loop sideslip control law is beneficial in providing stability and in limiting the sideslip to allowable values set by fin loads or fin stall.

It is desirable to allow aircraft development to be taken in the direction of reduced-stability aircraft configurations by developing adequate control laws for these configurations. Otherwise, aircraft design will be limited by conventional stability criteria and the capabilities of conventional control laws. Design objectives for high-performance aircraft having reduced tail sizes include: alleviation of gust loads; reduction of tail loads; reduction of structural loads; good lateral ride quality; good Dutch roll damping; good turn coordination; automatic engine-out control in the air; and good flying qualities.

Another aspect of aircraft control is the method by which aircraft behavioral data is obtained. It is well known to use mechanical sensing devices such as accelerometers and gyroscopes for detecting inertial parameters of the aircraft. Ring-laser gyros and accelerometers are used to obtain inertial data on modern transport aircraft. Sensed air data probes, or aerodynamic measuring probes, are also used to provide data for control systems. However, there is a measurement corruption inherent in aerodynamic measuring probes caused by the local aerodynamic flow fields around the aircraft surfaces where such probes are positioned. Measurement of sideslip angle relative to the air mass is particularly problem-prone. Aerodynamic sideslip vane sensors are prone to water ingestion, icing, physical damage, and other problems. Additionally, the use of an airmass sideslip measurement as direct sideslip feedback for directional stability augmentation aggravates the ride quality problem when turbulence is encountered. Thus, a means for economically and accurately estimating a sideslip angle signal suitable for directional stability augmentation and sideslip limiting must be provided if a sideslip control law is to perform adequately.

This invention overcomes the drawbacks of existing rudder command systems as described above, as well as others.

SUMMARY OF THE INVENTION

The aircraft rudder command system of the present invention allows the pilot to directly input a sideslip command for yaw-axis control through use of the rudder pedals. The aircraft rudder command system includes a pedal input device, such as a rudder pedal transducer, for receiving a pedal input signal indicative of pilot rudder pedal input, a signal-receiving device for receiving feedback signals indicative of the current state of aircraft operation, a command generator system responsive to the pedal input signal and at least one of the feedback signals for generating a sideslip angle command, and a feedback control system for transmitting the sideslip angle command to a rudder actuation system that causes the rudder to move in such a manner so as to produce an actual aircraft sideslip angle which follows the sideslip angle command. The sideslip angle command will be zero when the pedals are in their centered detent.

In accordance with further aspects of the present invention, the feedback signal to which the command generator system responds is an aerodynamic state variable signal. Examples of such variables are dynamic pressure, impact pressure, and/or a variety of airspeeds (calibrated, true, or equivalent) in conjunction with altitude. Additionally, the command generator system also includes a sideslip command limiter for limiting the value of the sideslip angle command to within an allowable range of values. The allowable range of values is a function of the aerodynamic state variable. In this manner, the actual aircraft sideslip angle is correspondingly limited.

In accordance with other aspects of the present invention, the feedback signals include a sideslip estimate signal, the sideslip command limiter generates a limited sideslip command, and the command generator system includes a switch device. The switch device is responsive to the sideslip estimate signal and the limited sideslip command, and causes the sideslip command limiter to be bypassed when the magnitude of the sideslip estimate signal is less than a predetermined proportion of the magnitude of the limited sideslip command. The switch device is additionally responsive to other command limit bypass conditions related to an aerodynamic state variable such as velocity.

In accordance with additional aspects of the present invention, the feedback control system includes a sideslip estimator for generating a sideslip estimate signal that is an estimate of the actual aircraft sideslip angle for steady state sideslip conditions. The sideslip estimator includes a complementary filter for receiving an airmass sideslip signal and for synthesizing the sideslip estimate signal from a sideslip rate signal and the airmass sideslip signal. In an additional embodiment, the feedback signals include an aerodynamic state variable, rudder deflection, and center-of-gravity lateral acceleration, and the sideslip estimator includes a sideslip deriver. The sideslip deriver generates the airmass sideslip signal from the feedback signals.

In accordance with still further aspects of the present invention, the feedback signals include sideslip estimate, and the feedback control system includes a combinatory node for differencing the sideslip angle command and the sideslip estimate signal to produce a sideslip error signal. The feedback control system also includes a proportional-plus-integral network for commanding a change in rudder position in response to the sideslip error signal.

It is an additional object of the present invention to provide an aircraft rudder command system for enabling a pilot to use rudder pedal input for aircraft yaw-axis control. The rudder command system includes a device for receiving a pedal input signal indicative of pilot rudder pedal input, a command generator system responsive to the pedal input signal for generating a sideslip angle command, a sideslip estimator, and a feedback control system. The estimator includes a component for receiving an airmass sideslip signal, a sideslip rate estimator for generating a sideslip rate estimate signal, and a complementary filter for synthesizing a sideslip angle estimate signal from the airmass sideslip signal and the sideslip rate estimate signal. The feedback control system causes the rudder to move in such a manner so as to cause the sideslip angle estimate signal to follow the sideslip angle command.

In accordance with other aspects of the present invention, the aircraft rudder command system includes a device for receiving feedback signals indicative of the current state of aircraft operation such as rudder deflection, center-of-gravity lateral acceleration, and an aerodynamic state variable. Additionally, the sideslip estimator includes a sideslip deriver for producing an airmass sideslip signal in response to the feedback signals.

It is a further object of the present invention to provide a sideslip estimator for use in an aircraft. The estimator includes a device for receiving an airmass sideslip signal, a sideslip rate estimator for generating a sideslip rate signal, and a complementary filter for synthesizing a sideslip angle estimate signal from the airmass sideslip signal and the sideslip rate signal.

The capability provided by the present invention allows the pilot to use a rudder pedal input to generate a sideslip command, rather than a rudder command, and provides tighter limiting of maximum sideslip overshoot than can be obtained by using only enhanced yaw augmentation and conventional rudder ratio changers. Static directional stability is enhanced, thereby allowing for large rudder activity to be commanded by the pilot without exceeding fin load limits. The sideslip command generator system improves flying quality by reducing the dependence on prompt pilot pedal input required to control asymmetric yawing moment conditions. Additionally, the sideslip command generator system provides automatic turn coordination in a roll maneuver by controlling sideslip to zero when the rudder pedal is at neutral.

BRIEF DESCRIPTION OF THE DRAWINGS

The foregoing objects and many other advantages of this invention will become more readily appreciated as the same becomes better understood by reference to the following detailed description, when taken in conjunction with the accompanying drawings, wherein.

DETAILED DESCRIPTION OF THE INVENTION

The aircraft rudder command system of the present invention is directly applicable to control of an aircraft with reduced vertical tail size. The aircraft rudder command system is also applicable to other aircraft configurations with consideration given to various limitations within and characteristics of the aircraft control system. The aircraft rudder command system includes a sideslip command generator system and a feedback control system. The aircraft rudder command system is included in an aircraft yaw-axis control system for controlling the rudder through a rudder actuation or servo-system, to physically displace the rudder to attain the sideslip angle indicated by the pilot pedal input.

Generally, a rudder pedal transducer generates a pedal input signal indicative of the pilot rudder pedal input, e.g., rudder pedal position or force. The sideslip command generator system and feedback control system generate a sideslip angle command directly from the pedal input signal. The sideslip angle command will be zero for pedals in their centered detent. A sideslip command limiter may be included in the sideslip command generator system to limit the sideslip angle command to allowable values. The allowable values vary as a function of an aerodynamic state variable. An estimated sideslip feedback signal is substracted from the (limited) sideslip angle command to produce a sideslip error signal. The feedback control system generates a sideslip control rudder command from the sideslip error signal. In response to the sideslip control rudder command, the aircraft rudder actuation system moves the rudder in such a manner as to cause the actual sideslip angle of the aircraft to follow the (limited) sideslip angle command.

Figure 1:
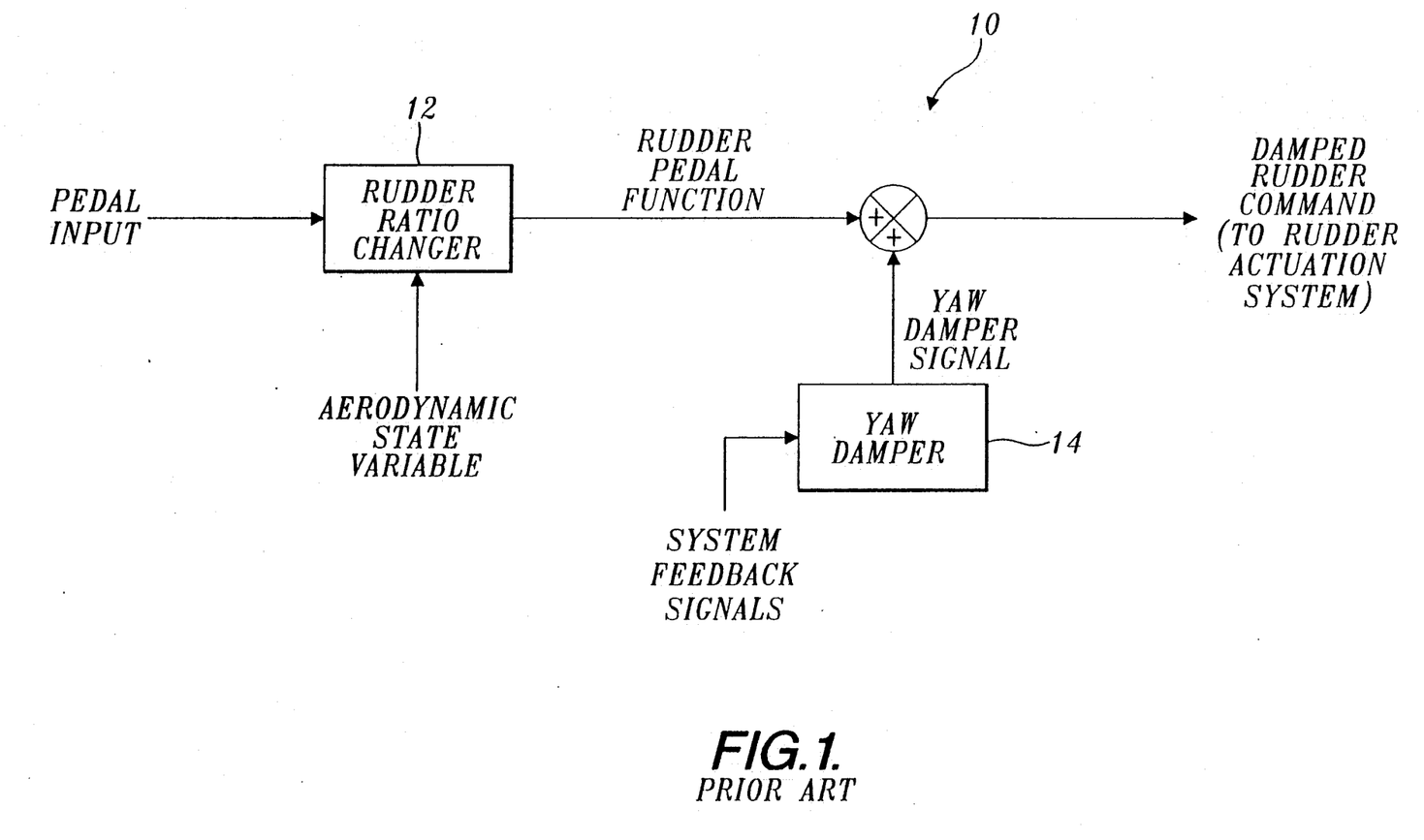
FIG. 1 is a block diagram of a prior art aircraft rudder command system based on pilot input of a rudder command.

In prior art rudder command systems, the pilot generally directly commanded the rudder position by means of mechanical control. With reference to FIG. 1, a prior art aircraft rudder command system 10 includes a rudder ratio changer 12, and a yaw damper 14. Aircraft rudder command system 10 obtains a pedal input signal from the pilot. The pedal input signal is indicative of pedal position and reflects the pilot's determination of desired rudder position.

The pedal input is scheduled as a function of an aerodynamic state variable in the rudder ratio changer (RRC) 12. Aerodynamic state variables that are suitable as input include: dynamic pressure; impact pressure; and/or a variety of airspeeds (calibrated, true, or equivalent) in conjunction with altitude. As an example, the aerodynamic state variable may be calibrated airspeed. In such a case, at low speeds, the RRC 12 may produce a rudder pedal function of 30° in response to full pedal input, i.e., when the pilot applies 100% pedal, whereas at high speeds, the RRC 12 may produce a rudder pedal function of 4° in response to full pedal input.

The rudder pedal function may then be combined with a limited authority yaw damper signal received from the yaw damper 14. The yaw damper signal is produced from system feedback signals such as yaw rate, lateral acceleration, and bank angle. The yaw damper signal is combined with the rudder pedal function, and the damped rudder command is transmitted to the rudder actuation system to affect the rudder position. In the prior art aircraft rudder command system 10, the pilot essentially directly manipulates the rudder position through use of the rudder pedals.

Figure 2:
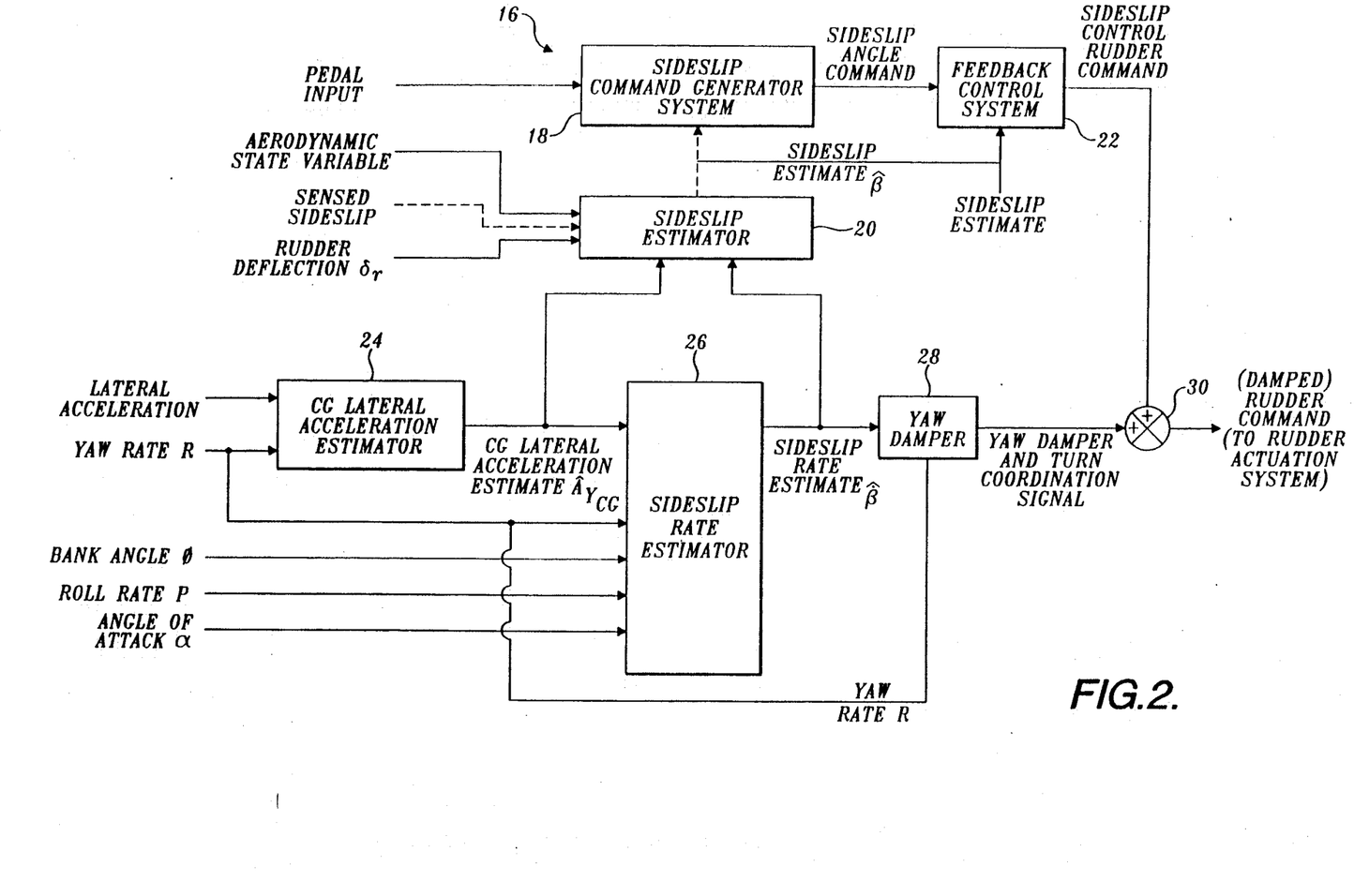
FIG. 2 is a block diagram of an aircraft rudder command system based on pilot input of a sideslip angle command in accordance with the present invention.

With reference to FIG. 2, in one preferred embodiment of the present invention, an aircraft rudder command system 16 includes a sideslip command generator system 18, a sideslip estimator 20, and a feedback control system 22. This portion of the aircraft rudder command system 16 produces a sideslip control rudder command corresponding to the pedal input. Rather than generating a rudder command signal with the pedal input that is indicative of desired rudder position, the pilot generates a rudder command signal with the pedal input that is indicative of desired aircraft sideslip angle.

For example, if the pilot desires to maneuver the aircraft at 10° sideslip then a pedal input corresponding to that sideslip angle is asserted. This is opposed to the aircraft rudder command system 10 wherein, given that 10° of sideslip is desirable, the pilot must intuitively determine the rudder position necessary to achieve the sideslip maneuver based on a variety of operating parameters. The rudder pedals would then be manipulated according to the pilot's determination of the rudder position needed to achieve the desired sideslip angle.

The aircraft rudder command system 16 also includes a center-of-gravity (CG) lateral acceleration estimator 24, and a sideslip rate estimator 26. These aircraft rudder command system components provide feedback signals to the remainder of the system. The aircraft rudder command system 16 further includes a yaw damper 28 for generating a yaw damper and turn coordination signal. The sideslip control rudder command may be combined at a summing node 30 with the yaw damper and turn coordination signal to produce a damped rudder command signal. Thus, the rudder command signal is either equivalent to the sideslip control rudder command signal or to the damped sideslip control rudder command signal. The rudder command signal is transmitted to the rudder actuation system. Data transmission for the aircraft rudder command system 16 is preferably implemented by electrical and-/or optical means, and optionally by digital data bus systems.

In one preferred embodiment, the aircraft rudder command system 16 utilizes signals indicative of: pedal position; aerodynamic state variables; rudder deflection $\delta_r$; lateral acceleration; yaw rate R; bank angle $\phi$; angle of attack $\alpha$; and roll rate P. In an alternative embodiment, the aircraft rudder command system also utilizes a sensed sideslip signal (shown in reference). All of these signals are feedback signals indicative of the current state of aircraft operation and pilot control.

Figure 3:
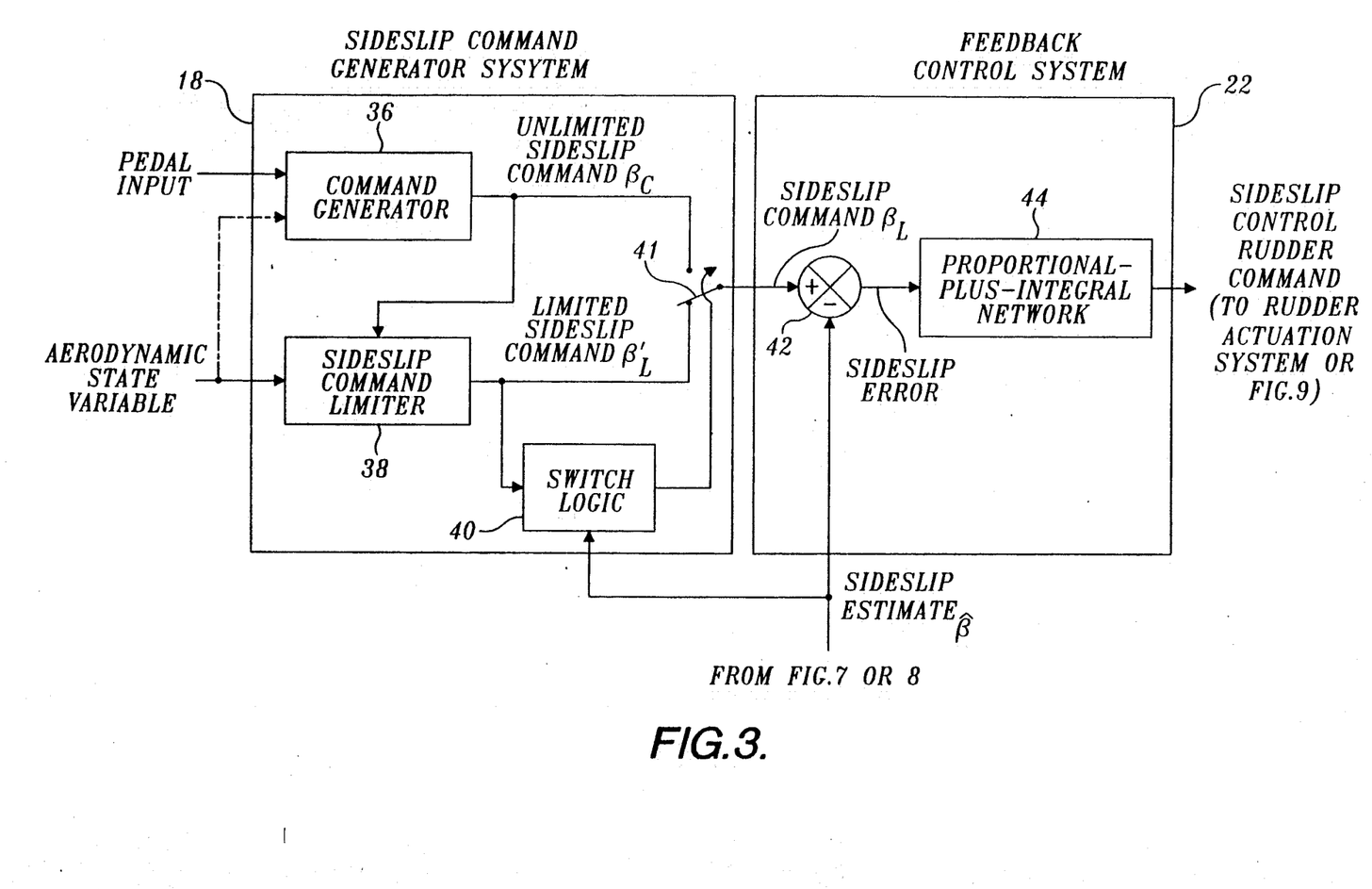
FIG. 3 is a block diagram of a sideslip command generator system and a feedback control system in accordance with the present invention.

With reference to FIG. 3, the sideslip command generator system 18 includes a command generator 36, a sideslip command limiter 38, switch logic 40, and a switch 41. The feedback control system 22 includes a combinatory node 42, and a proportional-plus-integral network 44. The command generator 36 preferably generates an unlimited sideslip command $\beta_c$ from pedal input. Alternatively, the command generator additionally utilizes an aerodynamic state variable as input. The sideslip command limiter 38 utilizes the unlimited sideslip command $\beta_c$ and an aerodynamic state variable to generate a limited sideslip command $\beta'_L$. The limited sideslip command $\beta'_L$ is compared to the sideslip estimate $\hat{\beta}$ (discussed below) in switch logic 40. The result of the comparison of the limited sideslip command $\beta'_L$ and the sideslip estimate $\hat{\beta}$ determines the positioning of switch 41. Switch 41 is configured to receive and transmit to combinatory node 42 either the unlimited sideslip command $\beta_c$ or the limited sideslip command $\beta'_L$. The signal transmitted by switch 41 is termed the sideslip command $\beta_L$.

In the feedback control system, the sideslip command $\beta_L$ is received and combined with the sideslip estimate $\hat{\beta}$. The difference between the signals is calculated at the combinatory node 42. The resultant signal is the sideslip error, i.e., the difference between the sideslip angle commanded by the pilot and the current estimated sideslip of the aircraft. The error signal is indicative of the amount of adjustment to the current sideslip required to achieve the desired pilot commanded sideslip. The sideslip error is passed through the proportional-plus-integral network 44 that generates the sideslip control rudder command.

Figure 4:
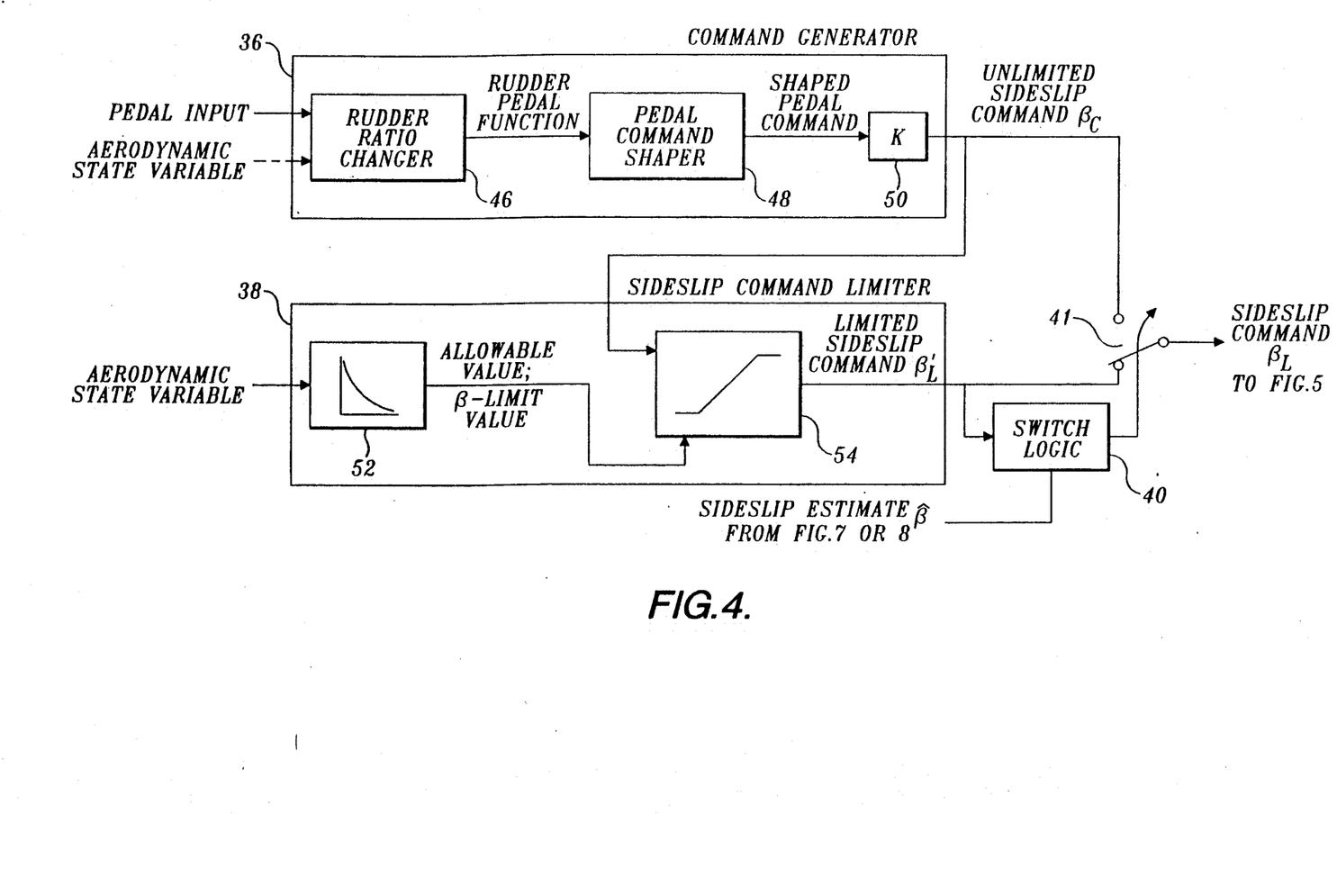
FIG. 4 is a detailed block diagram of a sideslip command generator system in accordance with the present invention.

With reference to FIG. 4, the command generator 36 includes: a rudder ratio changer (RRC) 46, a pedal command shaper 48, and a sideslip gain 50. The input to the RRC 46 is the pedal input.

The rudder ratio changer 46 prevents the rudder from going full travel when the aircraft is at high speeds. The RRC 46 limits maximum rudder position before maximum sideslip overshoot occurs, but does not affect the normal function of sideslip limiting at steady-state. This ensures the continuous functioning of the command generator 36. In one preferred embodiment, the RRC 46 is scheduled to a nominal value such as 1. In an alternative embodiment, an aerodynamic variable such as calibrated airspeed in conjunction with altitude is input to the RRC 46. The RRC 46 is then scheduled to be inversely proportional to the aerodynamic state variable. Since the RRC 46 is in a feed forward path, it does not change the closed-loop stability characteristics of the aircraft rudder command system 16. The RRC 46 can thus provide an approximately constant yaw acceleration signal for a given pedal input by using a pedal-to-rudder gearing that is variable with an aerodynamic state variable.

The rudder pedal function generated by the RRC 46 is converted to a shaped pedal command by the pedal command shaper 48. The pedal command shaper 48 applies maximum pedal input to the rudder pedal function to generate a shaped pedal command indicative of maximum rudder position and maximum sideslip. The sideslip gain 50 applied to the shaped pedal command produces an unlimited sideslip command $\beta_c$. The sideslip gain 50 converts the commands from pedal displacement units to degrees of sideslip. The sideslip gain 50 is alternatively positionable anywhere in the command generator 36.

The sideslip command limiter 38 includes a sideslip limit schedule 52 and a sideslip limiter 54. An aerodynamic state variable such as calibrated airspeed or impact pressure is input into the sideslip limit schedule 52. An allowable sideslip, i.e., $\beta$-limit value, is output from the sideslip limit schedule 52. The $\beta$-limit value is generated from a predetermined schedule related to characteristics of the aircraft. The schedule is a function of flight condition, represented by the aerodynamic state variable, relative to maximum steady-state sideslip limits defined by aircraft specific aerodynamics and structure. The allowable $\beta$-limit value is input into the sideslip limiter 54 as the limit value. The unlimited sideslip command $\beta_c$ is input to the sideslip limiter 54 as the value to be limited. The unlimited sideslip command $\beta_c$ is thus limited by the $\beta$-limit value to generate the limited sideslip command $\beta'_L$.

The limited sideslip command $\beta'_L$ is compared to the sideslip estimate $\hat{\beta}$ at the switch logic 40. The selection at the switch logic 40, as implemented by the switch 41, is necessary in order to make the sideslip response fast enough to meet landing de-crab heading change criteria. In air, at relatively low speeds, e.g., velocity-$c_{AS} \leq 180$ knots, with a small sideslip estimate $\beta$, and with a large pedal input, the switch 41 is in the up position to receive the unlimited sideslip command $\beta_c$. This signal is transmitted as the sideslip command $\beta_L$ until the sideslip estimate $\hat{\beta}$ reaches a certain percentage, determined for each aircraft configuration, of the limited sideslip command $\beta'_L$. At that point, the switch 41 is caused to connect with sideslip command limiter 38 so that the limited sideslip command $\beta'_L$ is transmitted as the sideslip command $\beta_L$. At relatively high speeds, e.g., CAS>180 knots, the switch 41 will always be down, i.e., the sideslip command $\beta_c$ will always be set to the limited sideslip command $\beta'_L$.

Figure 5:
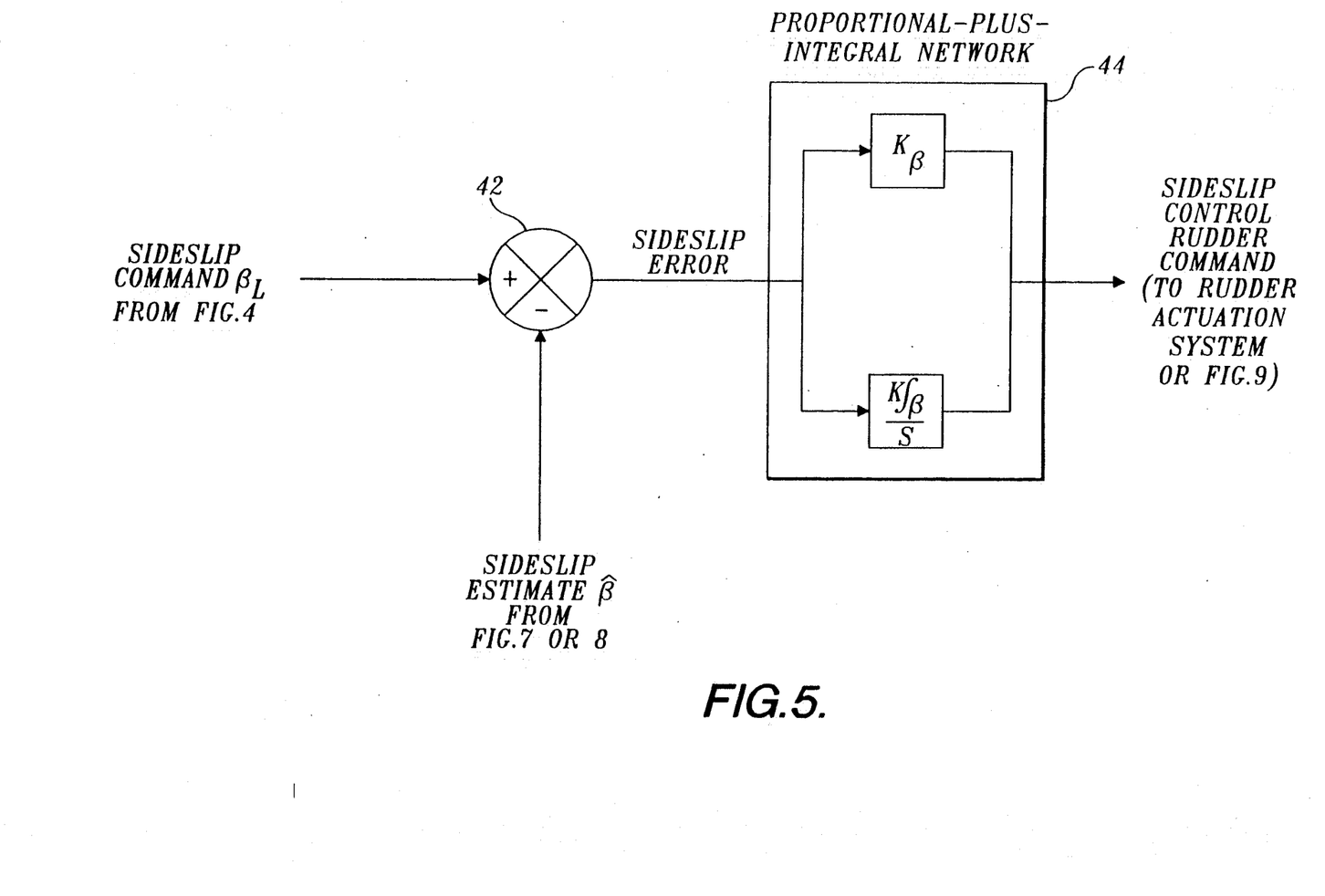
FIG. 5 is a detailed block diagram of a feedback control system in accordance with the present invention.

With reference to FIG. 5, the sideslip estimate $\hat{\beta}$ is subtracted from the sideslip command $\beta_L$ at combinatory node 42 to produce a sideslip error. The sideslip error is transmitted to the proportional-plus-integral network 44. Proportional sideslip error gain $K_\beta$ plus integral sideslip error gain $K_{f\beta}$ are used in the proportional and integral command paths to the sideslip control rudder command. Proportional-plus-integral network 44 generates a sideslip control rudder command that tends to hold sideslip constant with the rudder pedals fixed, thus augmenting static directional stability, i.e., yaw stiffness. The proportional sideslip error gain $K_\beta$ determines the bandwidth signal of the rudder control loop, i.e., the yaw closed-loop system bandwidth. Increasing $K_\beta$ will increase the bandwidth signal but reduce the closed-loop damping and the relative stability, e.g., phase margin decreases as $K_\beta$ increases. One preferred embodiment of proportional-plus-integral network 44 maximizes the rudder control loop bandwidth signal, i.e., increases $K_\beta$, so that the bandwidth signal is as high as possible, and meanwhile obtains adequate gain margin and phase margin. Thus, an optimal value for $K_\beta$ is determined for the specific aircraft configuration. The integral sideslip error gain for $K_{f\beta}$ removes steady-state error due to disturbances and modeling errors, and provides better damping by reducing Dutch roll oscillation due to low aerodynamic damping. For aircraft with reduced tail area configurations, the use of $K_\beta$ and $K_{f\beta}$ enhances the closed-loop damping of the aircraft rudder command system.

Figure 6:
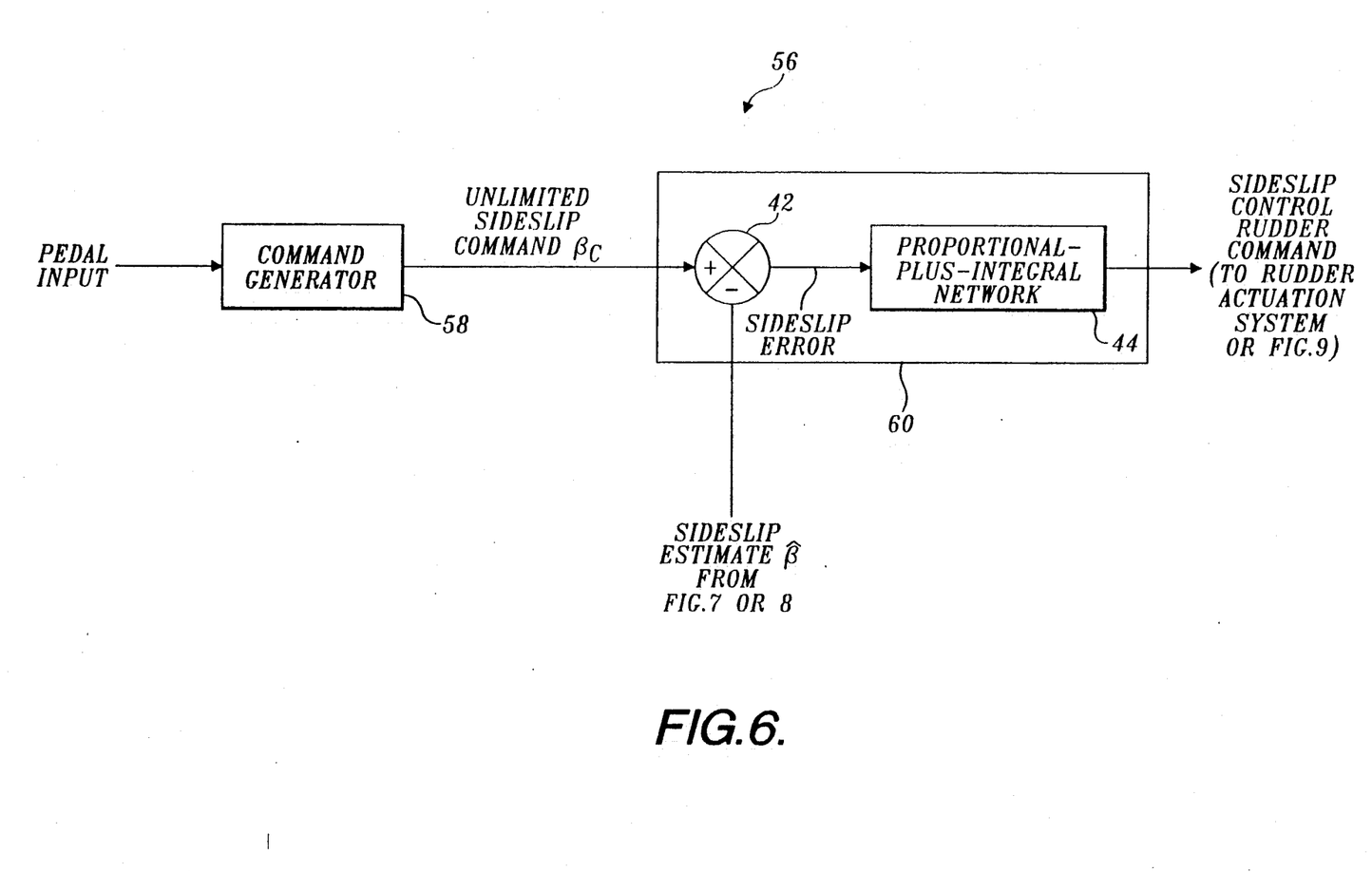
FIG. 6 is a detailed block diagram of a sideslip command generator system and a feedback control system in accordance with the present invention.

With reference to FIG. 6, an alternative preferred aircraft rudder command system 56 includes a command generator 58, and a feedback control system 60. The feedback control system 60 is similar to the feedback control system 22 discussed above. The command generator 58 is similar to the command generator 36. An unlimited sideslip command $\beta_c$ generated by the command generator 58 is transmitted to the combinatory node 42. At the combinatory node, the sideslip estimate $\hat{\beta}$ is subtracted from the unlimited sideslip command $\beta_c$ to produce the sideslip error. This is similar to a configuration of the sideslip command generator system 18 in which the switch 41 is permanently in the up position, i.e., a limiter is not explicitly provided. The sideslip generator 58 is suitable as a substitute for the sideslip command generator system 18 in the aircraft rudder command system 16.

Figure 7:
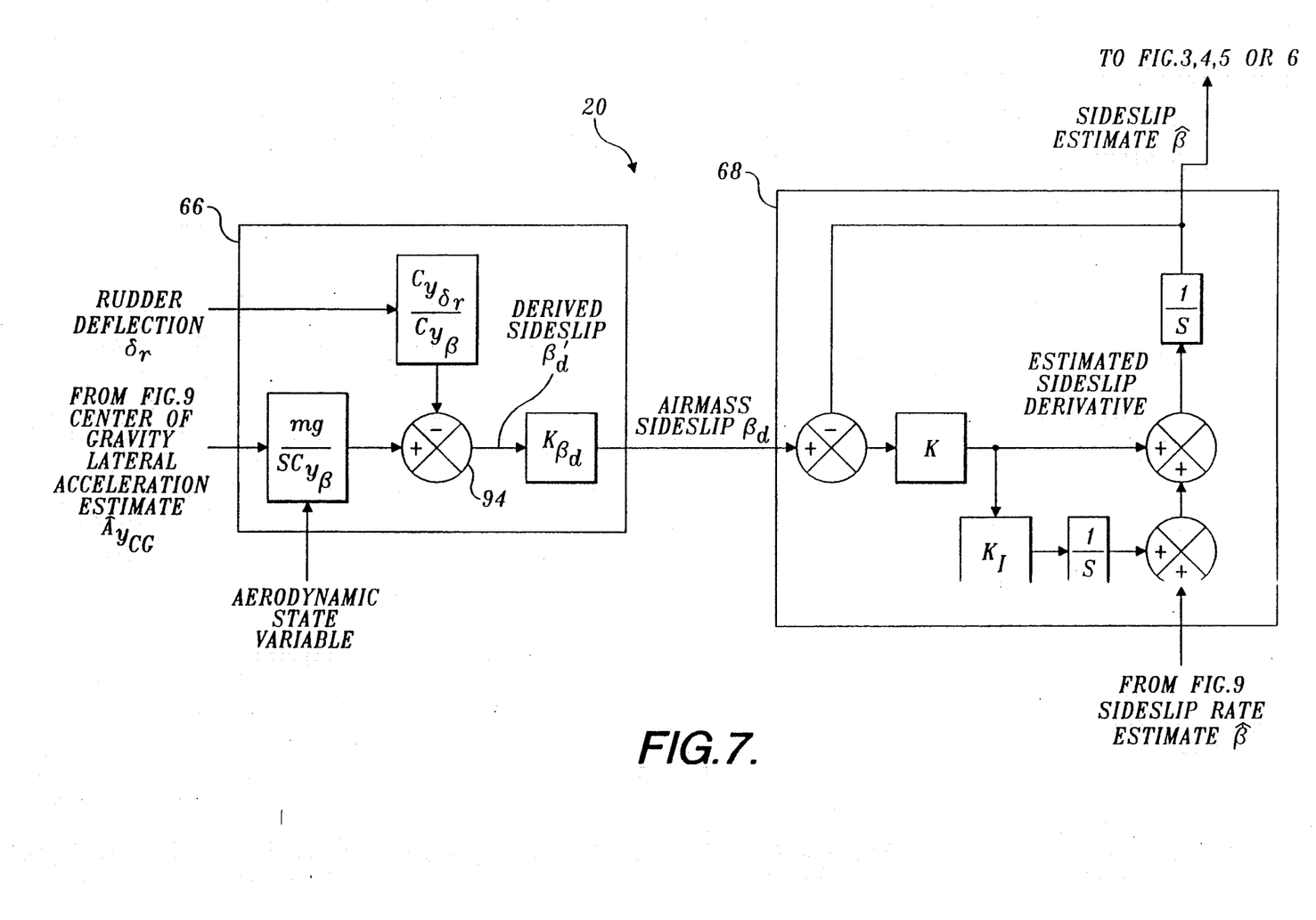
FIG. 7 is a detailed block diagram of a sideslip estimator in accordance with the present invention.

With reference to FIG. 7, the sideslip estimator 20 includes a sideslip deriver 66 and a complementary filter 68. The sideslip deriver 66 utilizes signals indicative of: rudder deflection $\delta_r$, an aerodynamic state variable, and center-of-gravity lateral acceleration estimate $\hat{A}_{yCG}$ (discussed below), to produce the airmass sideslip $\beta_d$. The airmass sideslip $\beta_d$ and the sideslip rate estimate $\dot{\hat{\beta}}$ (discussed below) are transmitted to the complementary filter 68. The complementary filter 68 generates a sideslip estimate $\hat{\beta}$. The sideslip estimate $\hat{\beta}$ is summed with sideslip command $\beta_L$ in the aircraft rudder command system 16 or 56.

When a sensed sideslip signal is not available to the rudder command system from a device such as a sideslip vane, a differential pressure sideslip sensor, etc., the sideslip deriver 66 utilizes signals indicative of rudder deflection $\beta_r$, an aerodynamic state variable, and center-of-gravity lateral acceleration estimate $\hat{A}_{yCG}$ to compute the airmass sideslip $\beta_d$. The airmass sideslip $\beta_d$ is derived by using an approximation of the aircraft's side force equation as follows:

$$\beta_d = \left[ \frac{mg\hat{A}_{yCG}}{(ASV)SC_{y\beta}} - \frac{C_{y\delta_r}\delta_r}{C_{y\beta}} \right] K_{\beta d} . \quad (1)$$

where:
  m equals mass;
  g equals gravity;
  $\hat{A}_{yCG}$ equals estimated center-of-gravity acceleration (in g's)
  ASV equals dynamic pressure (q) or impact pressure ($q_c$);
  S equals wing area;
  $C_{y\beta}$ equals side force sideslip derivative;
  $C_{y\delta_r}$ equals side force rudder derivative;
  $\delta_r$ equals rudder deflection; and
  $K_{\beta d}$ equals empirical correction gain (nominally equal to 1.0).

In Equation (1), the mass m is assumed constant with maximum 30% error for most aircraft. The side force sideslip derivative $C_{y\beta}$ and the side force rudder derivative $C_{y\delta}$ are also assumed to be constant. The signals are summed at a summing node 94 to produce the derived sideslip $\beta'_d$. The derived sideslip $\beta'_d$ is multiplied by the gain $K_{\beta d}$. The gain $K_{\beta d}$ compensates for errors in the aerodynamic modeling of the derived sideslip $\beta'_d$. The gain $K_{\beta d}$ has a nominal value of 1.0. By including gain $K_{\beta d}$, the sideslip deriver 66 reduces the susceptibility of the aircraft rudder command system to modeling errors. The sideslip deriver 66 thus produces a signal indicative of the airmass sideslip $\beta_d$.

In the complementary filter 68, a second order Kalman-type complementary filter is applied to the airmass sideslip $\beta_d$ and to the sideslip rate estimate $\dot{\beta}$ to produce the sideslip estimate $\hat{\beta}_d$. The sideslip estimate $\hat{\beta}$ is the integral of Equation (2):

$$\dot{\hat{\beta}} = \dot{\beta} + K(\beta_d - \hat{\beta}) + KK_I \int (\beta_d - \hat{\beta})dt \quad (2)$$

where:
  $\dot{\beta}$ equals sideslip rate estimate;
  K equals proportional gain;
  $\beta_d - \hat{\beta}$) equals error between airmass sideslip and sideslip estimate; and
  $KK_I$ equals integral gain.

In Equation (2), the second term is the proportional correction term, and the third term is the integral correction term. Potential sideslip drift caused by offsets in the inertial reference unit (IRU) parameters used to compute the sideslip rate estimate $\dot{\beta}$ at a sideslip rate estimator (discussed below), as well as computational errors in the airmass sideslip $\beta_d$, are removed by biasing the sideslip estimate derivative $\dot{\hat{\beta}}$ by the integral of the error between the airmass sideslip $\beta_d$ and the sideslip estimate $\hat{\beta}$.

The integral of the sideslip rate estimate $\dot{\beta}$ yields the high-frequency component for the sideslip estimate $\hat{\beta}$, and the airmass sideslip $\beta_d$ yields the low-frequency (and steady-state) component for the sideslip estimate $\hat{\beta}$. The gains K and $K_I$ determine the damping and frequency of the complementary filter 68 and act to minimize the airmass sideslip $\beta_d$ generated in response to gusts and turbulence. The gain K decreases the contribution of the sideslip rate estimate $\dot{\beta}$ and increases the contribution of the airmass sideslip $\beta_d$ to the sideslip estimate $\hat{\beta}$. The accuracy of the complementary filter 68 during both transient and steady-state phases is thus maintained when a roll angle sensor is lost or a large banking maneuver is being performed, i.e., conditions that degrade the accuracy of the sideslip rate estimate $\dot{\beta}$.

Figure 8:
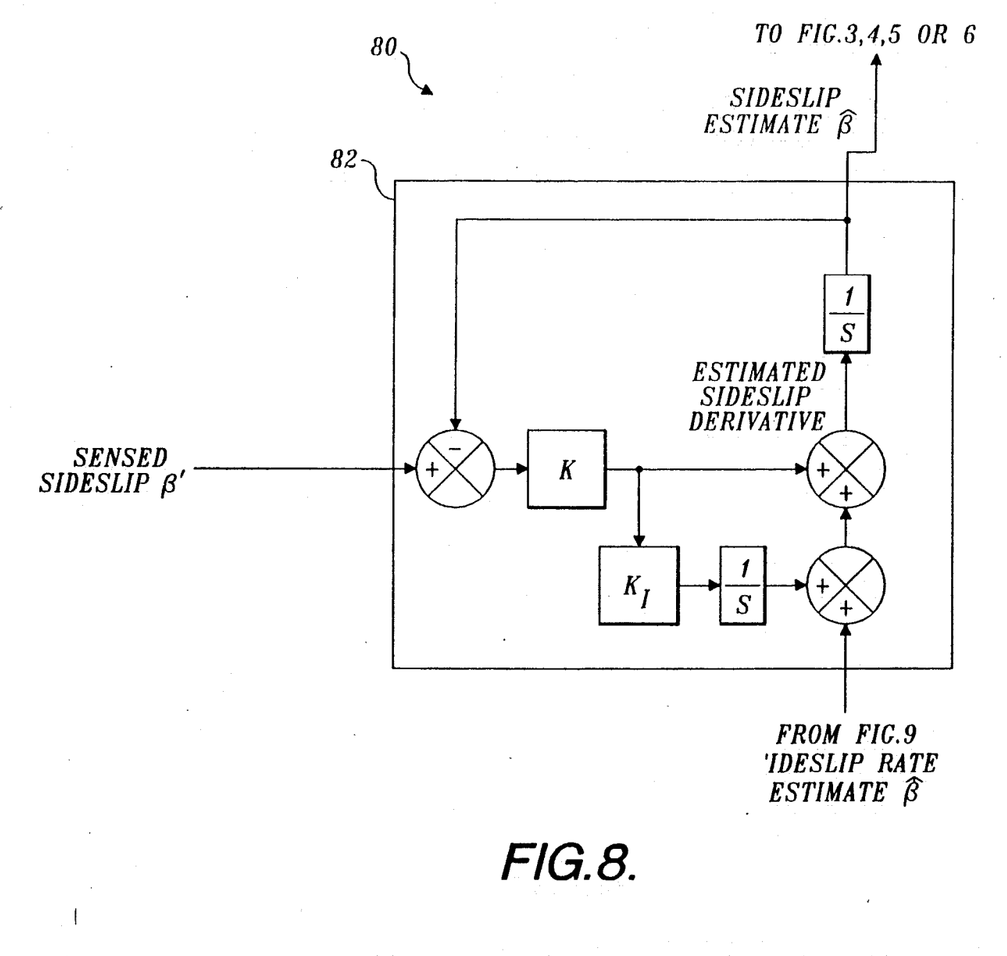
FIG. 8 is a detailed block diagram of an alternative sideslip estimator in accordance with the present invention.

With reference to FIG. 8, an alternative sideslip estimator 80 utilizes the feedback signal indicative of a sensed sideslip $\beta'$. The signal may be received from a mechanical device such as a sideslip vane or a differential pressure sideslip sensor. The sensed sideslip $\beta'$ is input into a complementary filter 82 that generates the sideslip estimate $\hat{\beta}$. The complementary filter 82 is a Kalman-type complementary filter similar to the complementary filter 68. The gain K for the complementary filter 82 is selected so that the resultant sideslip estimate $\hat{\beta}$ is more of a sideslip measurement than an integral of the sideslip rate estimate $\dot{\beta}$. Because the sensed sideslip $\beta'$ is directly obtained from the aircraft sensor system, a sideslip deriver such as the sideslip deriver 66 in the sideslip estimator 20 is not utilized and the center-of-gravity lateral acceleration estimate $\hat{A}_{yCG}$ is not required in order to generate the sideslip estimate $\hat{\beta}$.

The remainder of the sideslip estimator 80 is configured and operates in the manner described above in conjunction with the sideslip estimator 20. The sideslip estimator 80 is suitable for use in the aircraft rudder command system 16 or 56 as a substitute for the sideslip estimator 20. The major consideration for utilizing one or the other sideslip estimator is the availability, cost, and accuracy of a sensed airmass sideslip signal.

Figure 9:
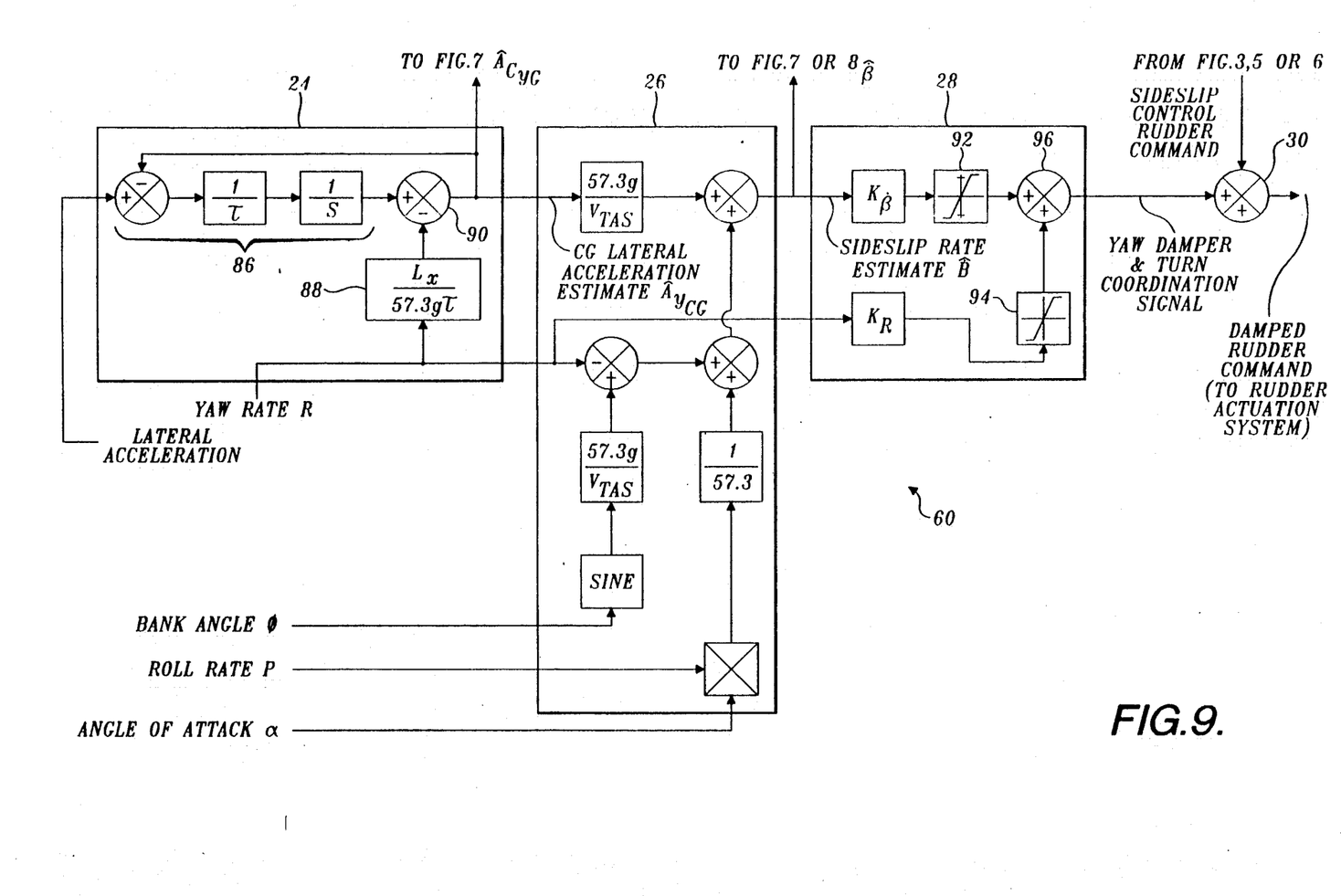
FIG. 9 is a detailed block diagram of a center-of-gravity lateral acceleration estimator, a sideslip rate estimator, and a yaw damper in accordance with the present invention.

With reference to FIG. 9, feedback signals representative of current aircraft operation are generated by the center-of-gravity lateral acceleration estimator 24 and the sideslip rate estimator 26. The center-of-gravity lateral acceleration estimator 24 receives signals indicative of lateral acceleration and yaw rate R, and generates a center-of-gravity lateral acceleration estimate $\hat{A}_{yCG}$. The center-of-gravity lateral acceleration estimate $\hat{A}_{yCG}$, yaw rate R, bank angle $\phi$, angle of attack $\alpha$, and roll rate P, are received by the sideslip rate estimator 26. The sideslip rate estimator 26 generates a sideslip rate estimate $\dot{\beta}$. The sideslip rate estimate $\dot{\beta}$ and yaw rate R are input into a yaw damper 28, which, in turn, generates a yaw damper and turn coordination signal.

The center-of-gravity lateral acceleration estimator 24 formulates a normalized body axis center-of-gravity lateral acceleration estimate $\hat{A}_{yCG}$ from signals indicative of lateral acceleration and yaw rate R. The center-of-gravity lateral acceleration estimator 24 includes a first-order complementary filter 86, a yaw rate corrector 88, and a summing node 90. The lateral acceleration signal is preferably determined from an inertial reference unit (IRU). In one actual embodiment, the IRU is an electromechanical device utilizing laser gyros to determine yaw, pitch, and roll rates and attitudes. Because the lateral acceleration is measured by an IRU a distance $L_x$ from the center-of-gravity, it contains an error due to yaw acceleration. This error is removed by adding a yaw rate correction signal generated by the yaw rate corrector 88 to the lateral acceleration value at the summing node 90.

In sideslip rate estimator 26, sideslip rate estimate $\dot{\beta}$ is formulated by:

$$\dot{\beta} = \frac{57.3 g \hat{A}_{yCG}}{V_{TAS}} - R + \frac{57.3 g \sin\phi}{V_{TAS}} \frac{Pa}{57.3} \quad (3)$$

where:

$V_{TAS}$ equals airspeed;
$\hat{A}_{yCG}$ equals estimate of center-of-gravity lateral acceleration (in g's);
R equals yaw rate;
$\phi$ equals bank angle;
P equals roll rate; and
$\alpha$ equals angle of attack.

In yaw damper 28, a yaw damper and turn coordination signal is computed based on the sideslip rate estimate $\dot{\beta}$ and the yaw rate R by the following equation:

$$T = K_{\dot{\beta}} \dot{\beta} + K_R R \quad (4)$$

where:

T equals the yaw damper and turn coordination signal;
$K_{\dot{\beta}}$ equals sideslip rate gain;
$\dot{\beta}$ equals sideslip rate estimate;
$K_R$ equals yaw rate gain; and
R equals yaw rate.

A limited yaw damper signal is generated by passing the yaw damper rudder commands $K_{\dot{\beta}} \dot{\beta}$ through limiter 92 and $K_R$ through limiter 94. The resultant signals are combined at the summing node 96.

For a system with a sideslip rate feedback gain only, by decreasing the gain $K_{\beta}$ as the dynamic pressure increases, constant Dutch roll damping is maintained. Otherwise, the system will have too high of a gain at high dynamic pressures. For a multi-input, multi-output controller where the proportional-plus-integral-plus-derivative sideslip gains, i.e., $K_{\beta}$, $K_{\int \beta}$, and $K_{\dot{\beta}}$, are used, relative stability can be maintained at high dynamic pressures by holding the gain $K_{\dot{\beta}}$ constant as the dynamic pressure increases. Generally, if the gain $K_{\dot{\beta}}$ is lowered at high dynamic pressure, the relative stability of the overall closed-loop system is reduced. Hence, the gain $K_{\dot{\beta}}$ is held constant in the preferred system.

When the gain $K_{\beta}$ is deactivated, i.e., set to zero, the overall system is a high-gain system and the closed-loop damping decreases. When an RRC with proper gain reduction is inserted before the rudder actuactor input, the system response with the gain $K_{\dot{\beta}} = 0$ is equivalent to response under normal conditions when the gain $K_{\beta}$ is equal to normal condition gain with no RRC. When the system function is normal, i.e., gains $K_{\beta}$, $K_{\int \beta}$, and $K_{\dot{\beta}}$ do not fail, adding a downstream RRC is equivalent to reducing the overall loop to a low-gain system. Hence, the closed-loop damping is increased to a point where the system response is very sluggish. If the RRC is moved ahead of the pedal command shaper, as recommended above, then excessive rudder deflections below the sideslip threshold are prevented and the overall closed-loop stability characteristic is not altered by the RRC because it is in the feed-forward path of the sideslip limiter.

While preferred embodiments of the invention have been illustrated and described, it will be appreciated that various changes can be made herein without departing from the spirit and scope of the invention. For example, a variety of combinations of the alternative embodiments of the sideslip command generator system and the sideslip estimator may be implemented in an aircraft rudder command system.

The proposed aircraft rudder command system is suitable for use in the rudder command system of any flight vehicle, even in unmanned vehicles such as missiles. For example, for a skid-to-turn missile, the sideslip command is used as a lateral acceleration command. For a coordinated bank-to-turn missile, the sideslip command is always kept at zero to limit sideslip excursions for coordinated flight.

Another benefit of the aircraft rudder command system is that the sideslip estimate $\hat{\beta}$ is suitable for use in other portions of the aircraft control system. For example, the sideslip estimate $\hat{\beta}$ cross-fed to the aileron control modifies the aircraft's aerodynamic rolling movement due to sideslip. Such a cross-feed can be used to improve roll control of an aircraft.

The embodiments of the invention in which an exclusive property or priviledge is claimed are defined as follows:

1. An aircraft rudder command system for enabling a pilot to use rudder pedal input for aircraft yaw-axis control, the rudder command system comprising:
   means for receiving a pedal input signal indicative of pilot rudder pedal input;
   means for receiving an aerodynamic state variable feedback signal indicative of the current state of aircraft operation;
   command generator means responsive to said pedal input signal and said aerodynamic state variable signal for generating a sideslip angle command, said command generator means including sideslip command limiter means for limiting the value of said sideslip angle command to within an allowable range of values, said allowable range of values being a function of said aerodynamic state variable signal, whereby said actual aircraft sideslip is correspondingly limited; and
   feedback control means responsive to said sideslip angle command for providing a signal suitable to cause the rudder of an aircraft to move in a manner that produces an actual aircraft sideslip angle which follows said sideslip angle command.

2. An aircraft rudder command system according to claim 1, wherein said feedback signals include sideslip estimate, said sideslip command limiter generates a limited sideslip command, and said command generator means further comprises switch means responsive to said sideslip estimate signal and to said limited sideslip command for bypassing said sideslip command limiter means when the magnitude of said sideslip estimate signal is less than a predetermined proportion of the magnitude of said limited sideslip command and to other command limit bypass conditions related to said aerodynamic state variable.

3. An aircraft rudder command system for enabling a pilot to use rudder pedal input for aircraft yaw-axis control, the rudder command system comprising:
   means for receiving a pedal input signal indicative of pilot rudder pedal input;
   means for receiving feedback signals indicative of the current state of aircraft operation, said feedback signals including sideslip rate;
   command generator means responsive to said pedal input signal and at least one of said feedback signals for generating a sideslip angle command; and
   feedback control means responsive to said sideslip angle command for providing a signal suitable to cause the rudder of an aircraft to move in a manner that produces an actual aircraft sideslip angle which follows said sideslip angle command, said feedback control means including sideslip estimator means for generating a sideslip estimate signal, said sideslip estimator means including complementary filter means for receiving an airmass sideslip signal and for synthesizing said sideslip estimate signal from said sideslip rate signal and said airmass sideslip signal, whereby said sideslip estimate signal estimates said actual aircraft sideslip angle for steady state sideslip conditions.

4. An aircraft rudder command system according to claim 3, wherein said sideslip rate signal is a computed estimate of inertial sideslip rate.

5. An aircraft rudder command system according to claim 3, wherein said feedback signals include an aerodynamic state variable, rudder deflection, and center-of-gravity lateral acceleration, and wherein said sideslip estimator means further includes:
sideslip deriver means for generating said airmass sideslip signal from said rudder deflection signal, said center-of-gravity lateral acceleration signal, and said aerodynamic state variable.

6. An aircraft rudder command system for enabling a pilot to use rudder pedal input for aircraft yaw-axis control, the rudder command system comprising:
means for receiving a pedal input signal indicative of pilot rudder pedal input;
means for receiving a sideslip estimate feedback signals indicative of the current state of aircraft operation;
command generator means responsive to said pedal input signal and said sideslip estimate feedback signal for generating a sideslip angle command; and
feedback control means responsive to said sideslip angle command for providing a signal suitable to cause the rudder of an aircraft to move in a manner that produces an actual aircraft sideslip angle which follows said sideslip angle command, said feedback control means including combinatory means for differencing said sideslip angle command and said sideslip estimate signal to produce a sideslip error signal, and proportional-plus-integral network means for commanding a change in rudder position in response to said sideslip error signal.

7. An aircraft rudder command system for enabling a pilot to use rudder pedal input for aircraft yaw-axis control, the rudder command system comprising:
means for receiving a pedal input signal indicative of pilot rudder pedal input;
command generator means responsive to said pedal input signal for generating a sideslip angle command;
a sideslip estimator, said estimator comprising means for receiving an airmass sideslip signal, sideslip rate estimator means for generating a sideslip rate estimate signal, and complementary filter means for synthesizing a sideslip angle estimate signal from said airmass sideslip signal and said sideslip rate estimate signal; and
feedback control means for causing the rudder to move in such a manner so as to cause said sideslip angle estimate signal to follow said sideslip angle command.

8. An aircraft rudder command system according to claim 7, further comprising means for receiving feedback signals indicative of the current state of aircraft operation, wherein said feedback signals include rudder deflection, center-of-gravity lateral acceleration, and an aerodynamic state variable, and wherein said sideslip estimator further includes:
sideslip deriver means for producing said airmass sideslip signal in response to said rudder deflection signal, said center-of-gravity lateral acceleration signal, and said aerodynamic state variable.

9. An aircraft rudder command system according to claim 7, further comprising means for receiving feedback signals indicative of the current state of aircraft operation, wherein said airmass sideslip signal is a feedback signal received from an airmass sideslip sensor.

10. An aircraft rudder command system according to claim 7, further comprising means for receiving feedback signals indicative of the current state of aircraft operation, wherein said feedback signals include an aerodynamic state variable signal, and said command generator means is responsive to said aerodynamic state variable signal as well as to said pedal input signal for generating said sideslip angle command.

11. An aircraft rudder command system according to claim 7, further comprising means for receiving feedback signals indicative of the current state of aircraft operation, said feedback signals including an aerodynamic state variable, and wherein said command generator means further comprises sideslip command limiter means for limiting the value of said sideslip angle command to within an allowable range of values, said range of values being a function of said aerodynamic state variable.

12. An aircraft rudder command system according to claim 11, wherein said sideslip angle estimate signal generated by said sideslip estimator estimates the actual aircraft sideslip angle, said sideslip command limiter generates a limited sideslip command, and said feedback control means causes the rudder to move in such a manner so as to cause said actual aircraft sideslip angle to follow said limited sideslip command.

13. An aircraft rudder command system according to claim 12, wherein said command generator means further comprises switch means responsive to said sideslip estimate signal and to said limited sideslip command for bypassing said sideslip command limiter means when the magnitude of said sideslip estimate signal is less than a predetermined proportion of the magnitude of said sideslip command limit, and to other command limit bypass conditions related to said aerodynamic state variable.

14. An aircraft rudder command system according to claim 7, wherein said feedback control means includes combinatory means for differencing said sideslip angle command and said sideslip estimate signal to produce a sideslip error signal, and proportional-plus-integral network means for commanding a change in rudder position in response to said sideslip error signal.

15. An aircraft rudder command system according to claim 7, wherein said command generator means includes command shaping means and a variable gain scheduled on an aerodynamic state variable feedback signal.

16. A sideslip angle estimator for use in an aircraft, said estimator including:
an airmass sideslip sensor for sensing the sideslip of an aircraft and generating an airmass sideslip signal;
a sideslip rate estimator for generating a sideslip rate signal; and complementary filter means coupled to said airmass sideslip sensor and said sideslip rate estimator for receiving said airmass sideslip signal and said sideslip rate signal for synthesizing a sideslip angle estimate signal based on said airmass sideslip signal and said sideslip rate signal.

17. A sideslip estimator according to claim 16, wherein said sideslip rate estimator means comprises a sideslip rate estimator for estimating inertial sideslip rate and thereby generating said sideslip rate signal.

18. A sideslip estimator according to claim 16, wherein said complementary filter means utilizes a second order complementary filter wherein the synthesis of said sideslip angle estimate signal is dominated by said sideslip rate signal for high frequency inputs and wherein the synthesis of said sideslip angle estimate signal is dominated by said airmass sideslip signal for low frequency inputs.

* * * * *

UNITED STATES PATENT AND TRADEMARK OFFICE
CERTIFICATE OF CORRECTION

PATENT NO. : 5,170,969             Page 1 of 2
DATED : December 15, 1992
INVENTOR(S) : Ching-Fang Lin It is certified that error appears in the above-identified patent and that said Letters Patent is hereby corrected as shown below:

| COLUMN | LINE | |
|---|---|---|
| Title Page: [56] "Foreign Patents" | 2nd Ref. | "6500522 2/1979 U.S.S.R." should read --650052 2/1979 U.S.S.R.-- |
| 5 | 17 | "substracted" should read --subtracted-- |
| 6 | 54 | "$\beta$" should read --$\hat{\beta}$-- |
| 7 | 62 | "$\beta$" should read --$\hat{\beta}$-- |
| 9 | 2 | "$\beta_r$" should read --$\delta_r$-- |
| 9 | 40 | "$\dot{\beta}$" should read --$\dot{\hat{\beta}}$-- |
| 9 | 41 | "$\hat{\beta}_d$" should read --$\hat{\beta}$-- |
| 9 | 47 | "$\dot{\beta}$" should read --$\dot{\hat{\beta}}$-- |
| 9 | 62 | "$\beta$" should read --$\hat{\beta}$-- |
| 10 | 2 | "$\beta$" should read --$\hat{\beta}$-- |
| 10 | 8 | "$\beta$" should read --$\hat{\beta}$-- |
| 10 | 15 | "$\beta$" should read --$\hat{\beta}$-- |
| 10 | 26 | "$\beta$" should read --$\hat{\beta}$-- |
| 11 | 32 | "$K\beta$" should read --$K\dot{\beta}$-- |

UNITED STATES PATENT AND TRADEMARK OFFICE
CERTIFICATE OF CORRECTION

PATENT NO. : 5,170,969

DATED : December 15, 1992

INVENTOR(S) : Ching-Fang Lin

It is certified that error appears in the above-identified patent and that said Letters Patent is hereby corrected as shown below:

| COLUMN | LINE | |
|---|---|---|
| 11 | 47 | "actuactor" should read --actuator-- |
| 11 | 49 | "K$\beta$" should read --K$\dot{\beta}$-- |
| 12 | 19 | "priviledge" should read --privilege-- |

Signed and Sealed this

Twenty-third Day of November, 1993

Attest:

Attesting Officer

BRUCE LEHMAN

Commissioner of Patents and Trademarks